March 10, 1942.   H. B. ROBBINS   2,275,655
MEANS FOR CEMENTING WELLS
Filed Nov. 16, 1940
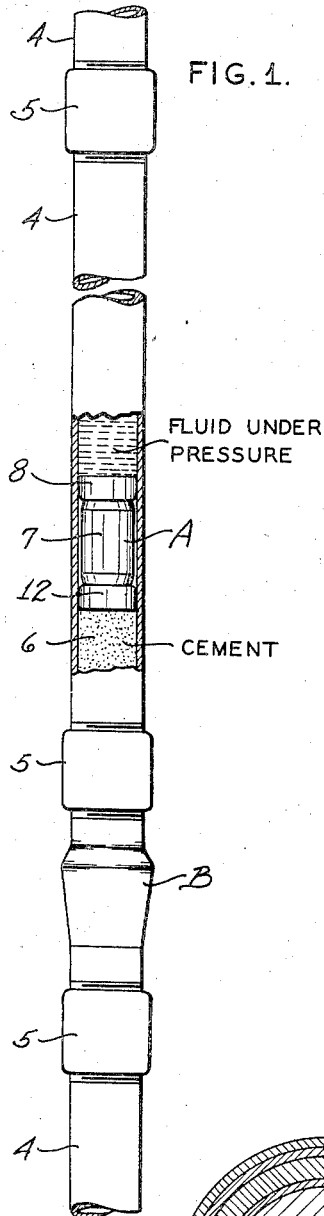
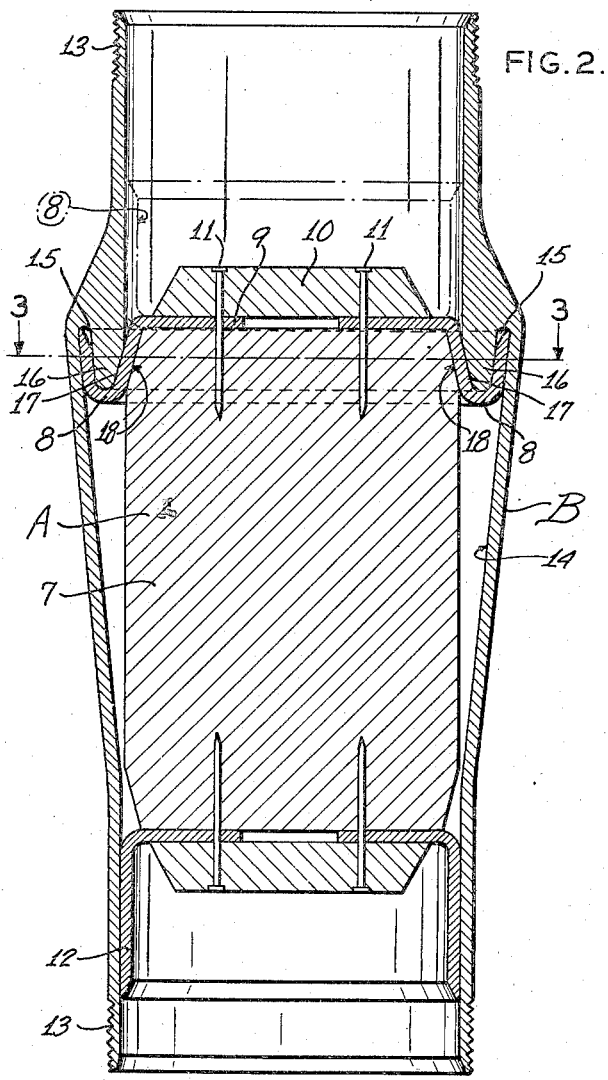
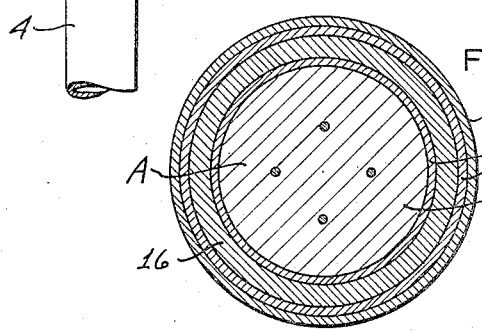
INVENTOR.
H. B. ROBBINS
BY Albert J. McCauley
ATTORNEY.

Patented Mar. 10, 1942

2,275,655

UNITED STATES PATENT OFFICE 2,275,655

MEANS FOR CEMENTING WELLS

Hall B. Robbins, Mount Carmel, Ill., assignor of one-half to William H. Otto, Mount Carmel, Ill.

Application November 16, 1940, Serial No. 365,859

5 Claims. (Cl. 166—1)

This invention relates to means for cementing wells, and the novel features may be employed to prevent undue displacement of cement after it is forced into an oil, gas or water well.

In drilling wells, an objectionable flow of water may appear at a point above the bottom of a well, and cement is often employed to form a compact collar which adheres to the outer face of the casing and fills the voids resulting from drilling, thereby excluding the objectionable fluid from the well.

An ordinary commercial practice consists in introducing the cement into the casing, or other passageway formed by a string of pipe which extends into the well, thereafter inserting a plug above the cement, and then forcing the plug downwardly in the string of pipe to forcibly discharge a stream of cement from the bottom of the passageway. Water is usually pumped into the upper end of the pipe or casing to force the plug to a point near the lower end of the string of pipe, thereby discharging the required quantity of cement which rises around the string of pipe to the necessary elevation above the bottom of the pipe, where it is to form the desired seal.

In this ordinary practice, the water above the plug is subjected to a very high pressure, for example, 500 pounds per square inch, or more, and after the plug has reached its destination near the bottom of the well, a valve in the water line above the ground is closed for the purpose of preventing return flow of the water. The object is to prevent displacement of the cement around the casing, and the valve usually remains closed for a period of three or more days required for the cement to set or harden. The water is thus confined under pressure in the casing, and all work in the well must be suspended until the end of hardening period.

A serious objection to this ordinary practice appears in the idle period wherein the crew of workmen are unable to proceed with the surface connections and other details necessary to continue the work of drilling the well. Another objection to the usual practice is found in the possibility of leakage of water at the above mentioned valve, and also at various points in the long string of pipe. The collar of cement in a fluid state around the casing may rise to a point several hundred feet above the bottom of the casing, and thereby exert a tremendous "back pressure" on the water inside of the casing. Consequently, any leakage of water from the casing will then allow the cement to flow upwardly inside of the casing, thereby displacing the predetermined seal. Furthermore, a very large volume of cement may be thus returned to the interior of the casing, which not only results in a waste of cement, but ultimately produces a long body of hard cement to be removed by subsequent drilling operations.

An object of the present invention is to eliminate the usual waste of time involved in closing the well and waiting several days for the cement to harden, at the same time eliminating the above mentioned trouble and expense heretofore resulting from leakage of water under pressure at the surface valve and at the joints of pipe which can not be relied upon to form a perfect seal throughout the long string of pipe.

A further object is to accomplish all of these results in an entirely feasible manner, without resorting to the use of complex, expensive, or otherwise objectionable appliances.

More specifically stated, an object is to produce an extremely simple means for immediately sealing the cement when it reaches its predetermined destination, thereby insuring the predetermined seal around the casing, and avoiding any objectionable return flow of cement into the casing.

In the preferred form of the invention, these results are accomplished by introducing the cement in the usual manner, inserting a simple expansible plug above the cement, forcing water or other fluid under pressure onto said plug to drive the plug downwardly to a predetermined point in the lower portion of the casing, thereby positively delivering the cement to its predetermined destination, and then interlocking the depressed plug with a retaining device in the casing, so as to retain the cement at said predetermined destination. I will hereafter show how an expansible portion of this simple plug can be bent and clamped to positively secure the plug in its depressed position, at the same time forming a tight seal between the plug and the casing.

The cement is then secured by the plug near the lower end of the casing, so the operators can open the top of the casing and remove all of the attachments employed in the cementing operation, and proceed with the usual surface connections and other details preparatory to the continued drilling. The drilling tools are eventually employed to destroy the simple plug, which may be made of wood, and also to drill through the predetermined small quantity of cement in the lower end of the casing.

With the foregoing and other objects in view, the invention comprises the novel combination and arrangement of parts hereinafter described to illustrate one form of the invention. However, it is to be understood that the invention comprehends modifications and variations within the scope of the terms employed in the claims hereunto appended.

Fig. 1 is a side view, partly in section, illustrating portions of a string of pipe equipped with devices adapted for use in carrying out the invention.

Fig. 2 is an enlarged vertical section showing the plug as it appears when interlocked with and clamped to a retaining device near the lower portion of the string of pipe.

Fig. 3 is a section on the line 3—3 in Fig. 2.

To illustrate the invention, I have shown a string of pipe sections 4 through which the cement is transmitted, said pipe sections having threaded ends to receive threaded couplings 5 whereby the sections are united to form an elongated string. The casing extending from the surface to the bottom of the well is ordinarily formed by uniting sections of pipe in this manner, and the illustration in Fig. 1 may be regarded as portions of the casing.

In cementing the well, the cement 6 in a fluid state may be introduced into the top of the passageway formed by the pipe sections 4, and a plug A may be inserted above the cement. The plug is forced downwardly in the cement passageway to forcibly discharge a stream of cement from the bottom of said passageway. For example, water or other fluid may be pumped into the upper end of the string of pipe to forcibly drive the plug downwardly in the pipe. This fluid pressure is transmitted through the plug, the pumping being continued until the traveling plug reaches a position near the lower end of the string of pipe. The fluid pressure is then released to allow the plug to rise a slight distance to a sealing position as will be hereinafter more fully described. The plug is retained in said sealing position to positively prevent displacement of the cement.

Prior to this invention, the water, or other fluid employed to depress the plug, was retained under pressure by closing a valve in the pipe system above the ground, so as to confine the long column of fluid above the plug, thereby closing the well for the purpose of maintaining the soft cement in the formation to which it is pumped. This resulted in the loss of time, as well as the probability of leakage and other difficulties previously set forth.

Attention is now directed to details of the new method of and means for positively confining the cement without closing the system above the plug.

In the preferred form of the invention, I employ an expansible plug of any suitable type. For example, I can economically use an extremely simple plug of the conventional type including a body portion 7 provided with a flexible annular packing flange 8 extending upwardly from the upper end of the plug, as shown by full lines in Fig. 1 and dotted lines in Fig. 2. This flexible flange 8 may form part of an ordinary cup-shaped packing member having an inturned lower portion 9 seated beneath a retaining disk 10 and secured by nails 11, or other fastening members, driven through said disk 10. If desired, a similar cup-shaped packing device may be likewise secured to the lower portion of the body of the plug, as shown in Fig. 2, wherein the flexible annular packing flange extends downwardly from the lower end of the plug.

When the plug is descending in the string of pipe, both of the flexible annular packing flanges are firmly forced into frictional contact with the inner face of the pipe, the upper flange 8 being subjected to the high pressure of the water or other fluid above the plug, and this pressure being transmitted through the body of the plug to the lower flange 12 which contacts with the cement.

To illustrate one form of the invention, and without limiting the patent to this specific construction and arrangement of details, I will now describe a suitable retaining means for preventing return of the traveling plug. This retaining means preferably interlocks with an expansible portion of the plug. More specifically stated, the retaining means is adapted to bend and thereafter clamp an expansible portion of the plug, so as to form an absolutely tight seal around the plug, and positively prevent or limit upward displacement of the plug.

I preferably employ a tubular retaining device B having threaded end portions 13 adapted to receive couplings 5 in the string of pipe, said tubular retaining device being united with the pipe sections 4 to form part of said string of pipe. However, this tubular device may be regarded as a relatively short nipple having end portions conforming to the internal diameter of the string of pipe, and an enlarged expanding zone between said end portions.

Fig. 2 illustrates a suitable expanding zone provided with a tapering friction surface 14 flaring upwardly from the internal diameter of the pipe to a relatively large diameter at the upper end of the expanding zone, so as to provide for gradual and positive expansion of the flexible packing flange 8 when the plug rises in said expanding zone. The upper portion of this expanding zone is provided with an annular recess 15 at the upper end of said tapering friction surface 14, and an annular depending abutment flange 16 surrounded by said recess 15. The recess is open at the bottom to receive the upper end of the flexible packing flange 8, while the depending abutment 16 is provided with a rounded lower edge at the inner side of the bottom of said recess 15 to produce a rounded bending surface for an intermediate portion of said packing flange. The inner face of said depending abutment 16 has an inclined clamping surface 17 to receive a portion of the bent packing flange, and the body of the plug has a complementary inclined clamping surface 18, so as to clamp the bent packing flange between said abutment 16 and the body of the plug.

The diameter of the body portion 7 of the plug is only slightly less than the internal diameter of the pipe sections, so the packing flange 8 will occupy the extended position shown by dotted lines in Fig. 2 while the plug is traveling downwardly in the pipe sections. This flexible flange will readily descend past the abutment flange 16 and expand onto the tapering face 14 below said flange 16. Thereafter, when the fluid pressure is released above the plug, said plug will immediately rise, and the packing flange 8 will then be bent and clamped as shown in Fig. 2. The abutment 16 will cooperate with the body of the plug to prevent continued upward displacement, and the firmly clamped packing flange 8 will serve as a gasket to prevent leakage around the plug.

The plug will be eventually destroyed in a subsequent drilling operation, but the tubular retaining device may be utilized as a permanent part of the casing. The flaring friction surface 14 will not interfere with upward or downward movements of the drilling equipment, and during upward movements of such equipment, the rounded and inclined surfaces of the abutment 16 will serve as a cam to deflect tools and the like from the enlarged expanding zone.

I claim:

1. In a cement retainer for a well equipped with casing comprising a string of pipe through which the cement is transmitted, and a traveling plug movable downwardly in the pipe to transmit fluid pressure to the cement, said traveling plug having a flexible annular packing flange; a tubular retaining device to prevent return of the traveling plug, and means for connecting said tubular retaining device to said string of pipe, said tubular retaining device being in the form of a threaded nipple having end portions conforming to the internal diameter of said pipe, and an enlarged expanding zone between said end portions, said enlarged expanding zone having a tapering friction surface flaring upwardly from the internal diameter of said pipe to a relatively large diameter at the upper end of said expanding zone, so as to provide for gradual expansion of said flexible packing flange, the upper portion of said expanding zone being provided with an annular recess at the upper end of said tapering friction surface, and an annular depending abutment surrounded by said recess, said recess being open at the bottom to receive the upper edge of said flexible packing flange, said annular depending abutment being provided with a rounded lower edge at the inner side of the bottom of said annular recess to produce a rounded bending surface for an intermediate portion of said packing flange, the inner face of said depending abutment having an inclined clamping surface to receive a portion of the bent packing flange, and the body of the plug being provided with a complementary inclined clamping surface, so as to clamp the bent packing flange between said depending abutment and the body of the plug.

2. In a cement retainer for a well equipped with a string of pipe through which the cement is transmitted, and a traveling plug having a flexible annular packing flange slidable downwardly along the inner face of the pipe to transmit fluid pressure to the cement, a tubular retaining device united with said string of pipe to prevent return of the traveling plug, said plug and tubular retaining device being provided with a combined bending and clamping means to bend said flexible packing flange and forcibly clamp the deformed flexible material between the body of the plug and said tubular retaining device, said combined bending and clamping means including an enlarged expanding zone provided with a combined bending and clamping member located within said tubular retaining device and having a diameter larger than internal diameters of upper and lower portions of said tubular retaining device, and a clamping member carried by said plug, the plug and its clamping member being movable upwardly while said flexible packing flange is confined within the enlarged expanding zone of said tubular retaining device, so as to bend and clamp the confined flexible material in said enlarged expanding zone.

3. In a cement retainer for a well equipped with a string of pipe through which the cement is transmitted, and a traveling plug movable downwardly in the pipe to transmit fluid pressure to the cement, said traveling plug having a flexible annular packing flange extending upwardly from a body portion of the plug; a tubular retaining device to prevent return of the traveling plug, and means for connecting said tubular retaining device to said string of pipe, said tubular retaining device having an enlarged expanding zone between its end portions to provide for deformation and clamping of the flexible packing material, the upper portion of said expanding zone being recessed and provided with a clamping abutment for said flexible packing flange, the recess being open at the bottom to receive the upper edge of said upwardly extending flexible packing flange, and the body of the plug being provided with a clamping abutment movable with the plug to cooperate with the first mentioned abutment in deforming and clamping said flexible packing material.

4. In a cement retainer for a well equipped with a string of pipe through which the cement is transmitted, and a traveling plug movable downwardly in the pipe to transmit fluid pressure to the cement, said traveling plug having a flexible annular packing flange; a tubular retaining device to prevent return of the traveling plug, and means for connecting said tubular retaining device to said string of pipe, said tubular retaining device having an enlarged expanding zone between its end portions, said enlarged expanding zone having a tapering friction surface flaring upwardly to form a relatively large diameter at the upper end of said expanding zone, so as to provide for gradual expansion of said flexible packing flange, the upper portion of said expanding zone being provided with an annular recess at the upper end of said tapering friction surface, and an annular depending abutment surrounded by said recess, said recess being open at the bottom to receive the upper edge of said flexible packing flange.

5. In a cement retainer for a well equipped with casing comprising a string of pipe through which the cement is transmitted, and a traveling plug movable downwardly in the pipe to transmit fluid pressure to the cement, said traveling plug having a flexible annular packing flange; a tubular retaining device to prevent return of the traveling plug, and means for connecting said tubular retaining device to said string of pipe, said tubular retaining device having an enlarged expanding zone between its end portions, said enlarged expanding zone having a tapering friction surface flaring upwardly from the internal diameter of said pipe to a relatively large diameter at the upper end of said expanding zone, so as to provide for gradual expansion of said flexible packing flange, the upper portion of said expanding zone being provided with an annular recess at the upper end of said tapering friction surface, and an annular depending abutment surrounded by said recess, said recess being open at the bottom to receive the upper edge of said flexible packing flange, said depending abutment having a clamping surface to receive a deformed portion of the flexible packing flange, and the body of the plug being provided with a complementary clamping surface, so as to clamp the deformed packing flange between said depending abutment and the body of the plug.

HALL B. ROBBINS.